Mar. 3, 1925.
J. P. CHEYNEY
IRRIGATION FLUME AND STANDPIPE GATE
Filed July 18, 1923
1,528,528
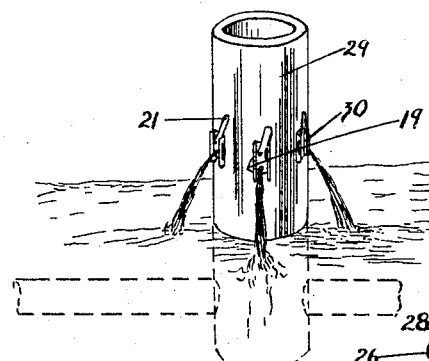
Fig.1.
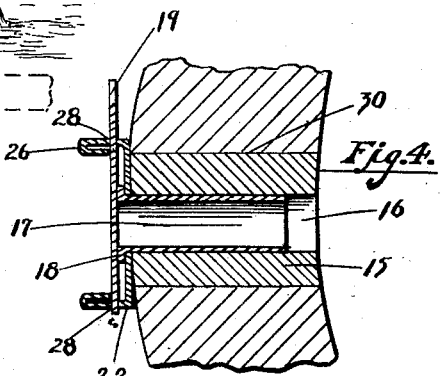
Fig.4.
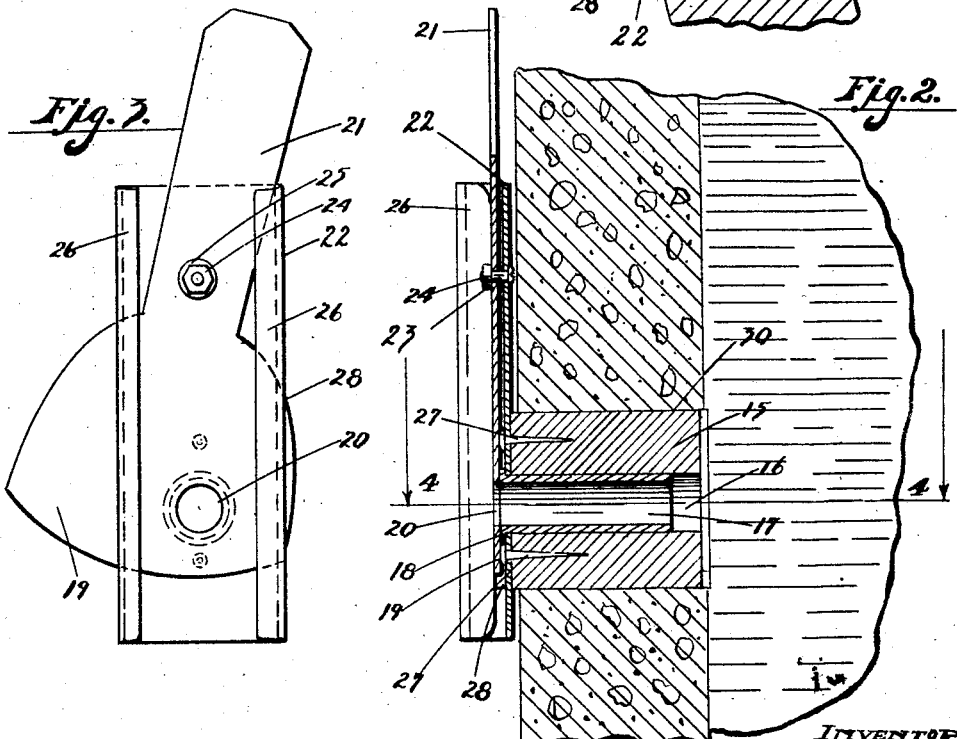
Fig.3.
Fig.2.
INVENTOR
Joseph P. Cheyney.
by Hazard and Miller
ATT'YS.

Patented Mar. 3, 1925.

1,528,528

UNITED STATES PATENT OFFICE.

JOSEPH P. CHEYNEY, OF REDLANDS, CALIFORNIA.

IRRIGATION FLUME AND STANDPIPE GATE.

Application filed July 18, 1923. Serial No. 652,241.

*To all whom it may concern:*

Be it known that I, JOSEPH P. CHEYNEY, a citizen of the United States, residing at Redlands, in the county of San Bernardino and State of California, have invented new and useful Improvements in Irrigation Flumes and Standpipe Gates, of which the following is a specification.

My invention relates to watergates adapted for use in connection with irrigation flumes and standpipes for controlling the discharge of water therefrom, and a purpose of my invention is the provision of a watergate of extremely simple and inexpensive construction, and one which may be readily applied to a flume or standpipe and securely held in water controlling position.

Although I have herein shown and will describe only one form of watergate embodying my invention and one application thereof, it is to be understood that various changes and modifications may be made herein without departing from the spirit of the invention and the spirit and scope of the appended claims.

In the accompanying drawings,

Fig. 1 is a view showing in perspective a standpipe having applied thereto one form of watergate embodying my invention.

Fig. 2 is a vertical sectional view of one of the watergates shown in Fig. 1 in applied position within the standpipe.

Fig. 3 is a detailed view showing in side elevation the gates shown in Fig. 2.

Fig. 4 is a horizontal sectional view taken on the line 4—4 of Fig. 2.

Referring specifically to the drawings in which similar reference characters refer to similar parts, my invention in its present embodiment comprises a block 15 formed of a material such as wood and the like which when moistened will expand. This block 15 is provided with a longitudinal extending bore 16 in which is snugly fitted a spout or short length of pipe 17 provided at its outer end with a collar 18 which constitutes a seat for a valve 19 of the rotary, sliding, or pivoted type. In the present instance, I have shown the valve 19 as being flat, and provided with a port 20 adapted to register at the outer end of the spout 17 to allow the discharge of water from the spout. This valve includes an operating shank 21 which is pivotally mounted upon a supporting body 22 by means of a screw bolt 23 extending through the body and shank and carrying a nut 24 and a washer 25.

The body 22 is preferably formed of a single length of metal bent along its marginal edges to provide lateral flanges 26, such flanges being co-extensive in length with the body so as to thoroughly reinforce the latter as a unit. This body is secured to the block 15 by means of fastening members 27 which latter, as shown in Fig. 2, are driven through the intermediate portion of the body and into the outer end of the block. As shown in Fig. 4, the flanges 26 are provided with slots 28 through which the valve 19 can slide in moving the port 20 into or out of registration with the outer end of the nozzle 17.

As previously mentioned, the watergate can be used in connection with an irrigation flume or standpipe, and in the present instance I have shown the gate in applied position within a standpipe as being illustrative of any possible application of the invention. In Fig. 1 a stand-pipe 29 is provided with an annular series of circumferentially spaced openings 30, in each of which is supported a watergate embodying my invention. As illustrated to advantage in Fig. 2, any one opening 30 receives a block 15, and as the block is formed of wood, the latter when moistened will expand so as to securely lock itself within the opening. As the block locks within the opening, the body 22 is rigidly supported in vertical position at the periphery of the standpipe so that the valve 19 can be operated to control the discharge of water from the standpipe through the nozzle 17. The operation of one gate is independent of the other gates so that the discharge of water from the standpipe at any point is within the control of the operator.

It will be particularly noted that the flanges 26 not only serve to reinforce the body but operate to maintain the valve 19 in firm contact with the seat 18 irrespective of the water pressure exerted upon the valve so that when the valve is in closed position the leakage of water from the nozzle is positively prevented.

After continued use, should the gate become worn so that the valve does not have a fluid tight contact with the nozzle, the flanges 26 can be bent, or a washer (not shown) placed beneath the seat 18 of the nozzle so as to restore the valve to fluid tight engagement with the nozzle. Although I have specified a pivoted valve, it is to be understood that a rotating or sliding valve can be used with equal success and without departing from the spirit of my invention.

An important feature of my invention is the provision of the slots in the flanges of the body which not only permits the use of the pivoted valve illustrated, but it also permits the use of a rotating or sliding valve and the securing of the valve irrespective of its type in fluid tight contact with the discharge end of the nozzle.

What I claim is:

1. A watergate, comprising a body formed of a single length of material bent to provide edge flanges, said flanges being formed with slots, a block of expansible material secured to the body, a discharge nozzle within the block, and a valve pivoted on the body and movable through said slots, said valve controlling said nozzle.

2. A watergate including a body formed of a piece of bendable sheet metal, said body having a port hole for liquid flow and having outbent flanges punched to form elongated slots, and a valve member frictionally engaged in the slots of the flanges and adapted to be retained thereby in different degrees of port opening.

3. A watergate including a body plate formed of a piece of sheet metal and having outbent side flanges which are punched out to provide longitudinal slots, a discharge duct having an outlet in said plate, and a valve member frictionally engaged in and shiftable to different positions through the slotted flanges and thereby adapted to be retained in various adjustments over the outlet.

4. A watergate having a sheet metal body plate with outbent side flanges which are longitudinally punched to form slots, a sheet metal valve member frictionally clinched in the slots and adapted to be held at different positions of adjustment, and a discharge duct over whose outlet the valve member is adjustable to vary discharge, said flanges being bendable to regulate pressure of the slot edges on the inserted valve member.

5. A watergate having a body provided with outbent flanges having elongated perforations forming slots, a discharge nozzle projecting from the back of the body for insertion in a wall, and a valve movably mounted in said slots and controlling flow through said nozzle; the valve being frictionally retained in adjustment by walls of the slots.

6. A watergate having a body provided with outbent flanges having elongated perforations, a discharge nozzle projecting from the back of the body for insertion in a wall, and a pivoted valve frictionally and slidably engaged in the slots and adjustable to control flow through the nozzle.

7. A watergate having a body plate, side flanges outbent along the plate and having elongated slots, a valve seat on the front of the plate, and a valve member frictionally clinched in the flange slots and adapted to be held in various positions of flow control on the seat and never leaving the said seat in any adjustment thereon.

In testimony whereof I have signed my name to this specification.

JOSEPH P. CHEYNEY.